(12) United States Patent
Hill et al.

(10) Patent No.: US 8,200,578 B2
(45) Date of Patent: Jun. 12, 2012

(54) METHODS AND SYSTEMS FOR ACCOUNT MANAGEMENT AND VIRTUAL AGENT DESIGN AND IMPLEMENTATION

(76) Inventors: Matthew D. Hill, Camas, WA (US); Scott L. McGrew, Vancouver, WA (US); Casey F. Uhrig, Vancouver, WA (US); Greg W. Johnson, Vancouver, WA (US); Kyle J. Nelson, Battleground, WA (US); Thomas F. Gillespie, Phoenix, MD (US)

( * ) Notice: Subject to any disclaimer, the term of this patent is extended or adjusted under 35 U.S.C. 154(b) by 122 days.

(21) Appl. No.: 12/170,376

(22) Filed: Jul. 9, 2008

(65) Prior Publication Data

US 2010/0010885 A1 Jan. 14, 2010

(51) Int. Cl.
G06Q 40/00 (2012.01)
(52) U.S. Cl. .............................. 705/40; 705/35; 715/705
(58) Field of Classification Search .................... 705/40, 705/35; 715/705
See application file for complete search history.

(56) References Cited

U.S. PATENT DOCUMENTS

| | | | |
|---|---|---|---|
| 5,727,950 A * | 3/1998 | Cook et al. | 434/350 |
| 6,330,551 B1 | 12/2001 | Burchetta | |
| 6,850,918 B1 | 2/2005 | Burchetta | |
| 6,954,741 B1 | 10/2005 | Burchetta | |
| 2003/0028477 A1* | 2/2003 | Stevenson et al. | 705/38 |
| 2003/0074290 A1* | 4/2003 | Clore | 705/35 |
| 2005/0086600 A1* | 4/2005 | Black et al. | 715/706 |
| 2007/0156554 A1* | 7/2007 | Nikoley et al. | 705/35 |
| 2008/0133402 A1* | 6/2008 | Kurian et al. | 705/38 |
| 2008/0255980 A1* | 10/2008 | Kasower | 705/35 |
| 2008/0293019 A1* | 11/2008 | Dooley et al. | 434/107 |
| 2009/0119588 A1* | 5/2009 | Moore | 715/706 |
| 2009/0259648 A1* | 10/2009 | Bokor et al. | 707/5 |

OTHER PUBLICATIONS

Jim DeBrosse Staff Writer. (Mar. 16, 2008). Negotiators in different cities now can sit at common table : A UD law professor uses Second Life Web site to teach her students future methods of mediation . . . Dayton Daily News,A.4. Retrieved Mar. 26, 2012.*
http://apolloenterprise.com/solutions/solutions.htm, Nov. 21, 2007.
http://oddcast.com/about/, Aug. 30, 2007.
http://www.debtresolve.com/products_how.php, Nov. 27, 2007.
http://www.debtresolve.com/products_tech.php, Nov. 27, 2007.
http://www.sitepal.com/howitworks.; Jul. 10, 2008.

* cited by examiner

Primary Examiner — Kito R Robinson
(74) Attorney, Agent, or Firm — Krieger Intellectual Property, Inc.; Scott C. Krieger

(57) ABSTRACT

Aspects of the present invention comprise systems and methods for design and use of web-based applications for account management. Some embodiments may comprise a virtual agent or avatar as part of an account collection or management web application. Some embodiments may comprise applications, utilities and tools for account-related web resource design.

20 Claims, 33 Drawing Sheets

Health Care Services

Issue Resolution

Please select one of the options listed so that we can assist you in resolving any issues with your account. — 40

Issue Resolution

- ○ I Can't Pay the Full Balance Today — 41
- ○ I Dispute Some or All of the Charges — 42
- ○ I am the Victim of Identity Theft — 43
- ○ I Paid this Bill Before I Received your Statement — 44
- ⦿ I Have Filed for Bankruptcy — 45
- ○ Other Reason — 46

[ Next > ]

Home
Contact Us
Payment Schedule
Logout

Disable

INTERPROSE

FIG. 5

SW Health Care Services

50 → Ok, If you can't pay the entire balance today we have several plans that may suit your needs. According to our records you qualify for the following plans. If you wish to take advantage of one of these plans simply check the appropriate plan option.

- Home
- Contact Us
- Payment Schedule
- Logout

51 → ● 10% Down and 6 Payments
52 → ○ 25% Down and 4 Payments
53 → ○ 50% Down and 3 Payments

[ Next > ]

Disable

INTERPROSE

FIG. 6

SW Health Care Services

Home
Contact Us
Payment Schedule
Logout

Dispute Reason — 61

Please explain why and what portion of the balance of $238.86 are you disputing? — 60

Amount Disputed — $ 0.00 — 62

[Next >]

Disable

INTERPROSE

Virtual Agent Tool Box

Virtual Agent Editor

Variables

| Name | Type |
|---|---|
| alimonyIncome | CURRENCY |
| Apply_for_CC | BOOLEAN |
| assets_CDs_Amount | CURRENCY |
| assets_CheckingAccount_Amount | CURRENCY |
| assets_Other_Value | CURRENCY |
| assets_RealEstate_Value | CURRENCY |
| assets_SavingsAccount_Amount | CURRENCY |
| BankoAttorney | STRING |
| BankoChapter | STRING |
| BankoCourt | |
| BankoDate | DATETIME |

128

| Name | BankoCourt |
|---|---|
| Type | STRING ▾ |

[Save] [Delete] [Clear]

FIG. 13

Virtual Agent Preferences

| | |
|---|---|
| Pay By Credit Card | ☑ |
| Pay By ACH | ☑ |
| Enable Self Signup | ☐ |
| Login Via Zip | ☑ |
| Hide Customer Account Number | ☐ |
| SitePal ID | 73718 |
| SitePal ID #2 | 920019 |
| SitePal ID #3 | 7a305b5aacdf9564aa60 |
| LogOff url | |
| Home Link - Prompt | Start ☑ |
| Payment History Caption | The following details your account payment history to date, please contact us if yc questions. |
| Login Name Label | Account Number On Collection Notice |
| Password | Zip Code On Collection Notice |
| Lost Password Text: | Please enter your email address below and press the 'Create New Password' butt password will be emailed to you. |
| Register Text | Click here to register |
| | Save |

FIG. 14

Virtual Agent Stats

Select Date Range

[Select a preset] ▼  06/01/2008  or...  06/30/2008  Lookup

🖨 Print

Virtual Agent Stats

| | | | |
|---|---|---|---|
| Completed | 1 | Aborted | 43 |
| Payments | 1 | Settlements | 0 |
| Bankruptcies | 0 | Disputes | 1 |
| Sessions | 44 | | |

FIG. 15

Welcome Home Node

Type

Node Label

Text

SUMMARY

Welcome Home Node

Hello, welcome to the Victoria Health System, my name is Grace and I will be assisting you today.

If you need to start over at any time, simply click on the Home link above.

Please click Next to continue.

Next

Payment System Test ▼

[Save] [Delete] [Clear]

FIG. 16

| Payment System Test | |
|---|---|
| Type | |
| Node Label | |
| Logic | LOGIC |
| | Payment System Test |
| | Payment System Demo |
| True | Pay in Full Today |
| False | Pre-Registration Test |
| | Save  Delete  Clear |

FIG. 17

| Pay in Full Today | |
|---|---|
| Type | QUESTION |
| Node Label | Pay in Full Today |
| Page Label | |
| Text | Can you pay your account in full today? Click <b>Yes</b> to make payment, or <b>No</b> for more options. |
| | ✗ |
| True | SettlePayPlan ▾ |
| False | Please Select One ▾ |
| | Save  Delete  Clear |

FIG. 18

| | | |
|---|---|---|
| Please Select One | | |
| Type | OPTIONS | |
| Node Label | Please Select One | |
| Page Label | Issue Resolution | |
| Text | Please select one of the options listed so that we can assist you in resolving any issues with your account. | |

Options

| | Label | Variable | Prompt |
|---|---|---|---|
| | I Can't Pay the Full Balance Today — 130 | PartialPayment | 13 |
| | I Dispute Some or All of the Charges | DisputeCharges | 24 |
| | I am the Victim of Identity Theft | DisputeIDTheft | 27 |
| | I Paid this Bill Before I Received your Statement | DisputePrevPaidDate | 25 |
| | I Have Filed for Bankruptcy  131 | DisputeBankruptcy | 40 |
| | I Would Like to Apply for Financial Assistance | Apply_for_CC | 191 |
| | Other Reason | DisputeOther | 26 |

— 132

Update Option

| | |
|---|---|
| Label | I Can't Pay the Full Bala |
| Variable | PartialPayment |
| Prompt | Payment Plan Options |

[Save] [Delete] [Clear]

[Save] [Delete] [Clear]

FIG. 19

| Dispute Charges | |
|---|---|
| Type | PROPERTY_SET |
| Node Label | Dispute Charges |
| Page Label | |
| Text | Please explain why and what portion of the balance of ${currentBalance} are you disputing? |

Properties

| | Label | Type | Variable | Required |
|---|---|---|---|---|
| | Dispute Reason | TEXT_AREA | DisputeCharges | true |
| | Amount Disputed | CURRENCY | DisputeAmount | true |

Update Property

| | |
|---|---|
| Label | I Can't Pay the Full Bala |
| Variable | PartialPayment |
| Type | |
| Required | False |

[ Save ] [ Delete ] [ Clear ]

| Next Node | CalcUnDisputedAmount |
|---|---|

[ Save ] [ Delete ] [ Clear ]

FIG. 20

| CalcUnDisputedAmount | |
|---|---|
| Type | MATH |
| Node Label | CalcUnDisputedAmount |
| Parameter 1 | ${currentBalance} |
| Operator | Minus (-) |
| Parameter 2 | ${DisputeAmount} |
| Assign Result To | currentBalance |
| Next Node | PayUnDisputedAmount |
| | Save  Delete  Clear |

FIG. 21

| SettlePayPlan | |
|---|---|
| Type | PAYMENT_PLAN |
| Node Label | SettlePayPlan |
| Start Date (max number of days from today) | 14 |
| Number Of Payments | 1 |
| Payment Frequency | Monthly ⌄ |
| Payment Amount | $ 0.00 ⌄ currentBalance ⌄ |
| Payment Total | $ 0.00 ⌄ |
| Down Payment Percent | 0.0 % ⌄ |
| Period | 1 |
| Next Node | ⌄ |
| | End  Save  Delete  Clear |

FIG. 22

| BankoCounter | |
|---|---|
| Type | BANKRUPTCY |
| Node Label | BankoCounter |
| Chapter Type | BankoChapter |
| Case Number | BankoNumber |
| District | |
| Court Name | |
| State | |
| File Date | BankoDate |
| Dismissed | |
| Dismissed Date | |
| Discharged | |
| Discharged Date | |
| Attorney First Name | BankoAttorney |
| Attorney Middle Name | |
| Attorney Last Name | |
| Attorney Firm | |
| Attorney Phone | |
| Attorney Address1 | |
| Attorney Address2 | |
| Attorney City | |
| Attorney State | |
| Attorney Zip | |
| Node Label | BankoCounter |
| True | Follow Up |
| | [Save] [Delete] [Clear] |

FIG. 23

| DisputeCounter | |
|---|---|
| Type | |
| Node Label | DISPUTE |
| Dispute Type | DisputeCounter |
| Dispute Reason | DisputeOther ⌄ |
| Dispute Amount | DisputePrevPaidMethod ⌄ |
| | DisputePrevPaidAmount ⌄ |
| True | Follow Up ⌄ |
| | Save  Delete  Clear |

FIG. 24

| | |
|---|---|
| Message to Patient | |
| Type | EMAIL |
| Node Label | Message to Patient |
| Email Recipients (comma separated) | ${debt.email} |
| Subject | Victoria Health System - Financial Assistance Application |
| Email | Dear ${debt.firstName},<br><br>Thank you for completing the Financial Assistance Application. One of our representatives will be contacting you shortly to verify your benefit eligibility.<br><br>Sincerely,<br>Grace Harbinger<br>Patient Financial Services<br>Victoria Health System |
| True | |
| | Save  Delete  Clear |

| VARIABLE | |
|---|---|
| Node Label | Set SIF 2 Payments |
| Value | 2 |
| Assigned To Variable | SIFNumberOfPayments ▾ |
| Next Node | SIF BiWeekly Frequency ▾ |
| | Save  Delete  Clear |

FIG. 27

| | |
|---|---|
| Type | EVAL |
| Node Label ▲ | DemographicCompare |
| Script | ```
var changed = false;

if
(primaryDemographic.getFirstName().equalsIgnoreCase(demographicFirstName))
{
    promptEngine.contextLookup("demographicFirstName").setValue("");
} else {
    changed = true;
    primaryDemographic.setFirstName(demographicFirstName);
} if
(primaryDemographic.getLastName().equalsIgnoreCase(demographicLastName))
{
    promptEngine.contextLookup("demographicLastName").setValue("");
} else {
    changed = true;
    primaryDemographic.setLastName(demographicLastName);
} if
(primaryDemographic.getAddress1().equalsIgnoreCase(demographicAddress1))
{
    promptEngine.contextLookup("demographicAddress1").setValue("");
} else {
    changed = true;
    primaryDemographic.setAddress1(demographicAddress1);
} if
``` |
| | Search \| Replace \| Current line \| Jump to line \| Insert constructor \| Indent all |
| True | Demographic Email |
| False | Summary |
| | Save \| Delete \| Clear |

| FA Application Page 1 | |
|---|---|
| Type | FORM |
| Node Label | FA Application Page 1 |
| Text | We need to gather some information to qualify you for benefits. Please answer the questions and then click NEXT.<br><br>IMPORTANT: You will need to send copies of the documents listed below within 15 DAYS for your application to be accepted. You can print this form by clicking on the Printer icon on your browser.<br><br><nospeak><br>REQUIRED DOCUMENTS |
| Form | Financial Assistance - Page 1 |
| Next Prompt | Financial Assistance - Pg 2 |

Save  Delete  Clear

FIG. 31

| Fields | 140 | | | | |
|---|---|---|---|---|---|
| Label | Identifier | Type | Required | Searchable | Summary |
| How Many Family Members Live with You? | familyCount | STRING | true | false | true |
| Gross Monthly Income | grossIncome | GROUP | false | false | true |
| Applicant | applicantGrossIncome | CURRENCY | true | false | true |
| Applicant Spouse | spouseGrossIncome | CURRENCY | false | false | false |
| Social Security | socialSecurityIncome | CURRENCY | false | false | false |
| VA Pension | VAPension | CURRENCY | false | false | false |
| Unemployment | unemploymentIncome | CURRENCY | false | false | false |
| Workers Comp | workersComp | CURRENCY | false | false | false |

Update Field 141

| | |
|---|---|
| Label | Interest Income |
| Identifier | interestIncome |
| Type | CURRENCY |
| Group | |
| New Line | False |
| Required | False |
| Searchable | False |
| Display On Summary | False |

[ Save Field ] [ Delete Field ] [ Clear Field ]

Preview:

Financial Assistance - Page 1

| How Many Family Members Live with You? | 142 |
|---|---|
| Gross Monthly Income | Applicant $ ____ Applicant Spouse $ ____ Social Security $ ____ <br> VA Pension $ ____ Unemployment $ ____ Workers Comp $ ____ <br> Interest Income $ ____ Dividend Income $ ____ Child Support $ ____ <br> Alimony $ ____ Rental Income $ ____ Foods Stamps $ ____ <br> Other Income $ ____ Other Income $ ____ |
| Assets | Savings Account $ ____ Checking Account $ ____ C.D.'s $ ____ <br> Other Real Estate $ ____ Other Assets $ ____ |

FIG. 32

FIG. 33

METHODS AND SYSTEMS FOR ACCOUNT MANAGEMENT AND VIRTUAL AGENT DESIGN AND IMPLEMENTATION

FIELD OF THE INVENTION

Embodiments of the present invention comprise methods and systems for the design, management, implementation and use of web-based applications for account management.

BACKGROUND

A great deal of modern commerce involves the use of credit accounts that allow consumers to obtain goods, services, cash and other commodities in exchange for an agreement to pay the requisite fees under pre-defined terms. Many of these consumers or account-holders/borrowers honor their agreements and pay the requisite fees according to the agreed-upon terms. However, a certain number of account-holders are not willing or are not able to uphold their end of the agreement and do not pay the requisite fees. When payment terms are violated, creditors may be forced to take action to collect the debt.

A creditor may have several options for collecting the debt. A creditor can contact the borrower and renegotiate the agreement or take legal action to enforce the agreement. Both of these options involve additional work and expense. Contacting a borrower may involve research to locate the borrower and additional time to travel to the borrower and make contact. Once contacted, the borrower may be uncooperative. In many cases, this additional expense cannot be recovered by the creditor. The expense of legal action is also well known and, in many cases, may be more than the debt to be collected. Furthermore, a borrower may be judgment-proof, wherein he or she does not have enough assets to cover the debt even when a legal action forces such payment.

If a creditor cannot find a method for efficient collection of over-due debts, the creditor may have to incur unexpected losses.

Many account-holders who do not have delinquent accounts also seek a convenient method for paying and managing their debts.

SUMMARY

Some embodiments of the present invention comprise methods and systems for design and use of web-based applications for account management. Some embodiments may comprise a virtual agent or avatar as part of an account collection or management web application. Some embodiments may comprise applications, utilities and tools for account-related web resource design, management and implementation.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a screenshot of an exemplary account summary web page;

FIG. 3 is a screenshot of an exemplary payment start date web page;

FIG. 5 is a screenshot of an exemplary issue resolution web page;

FIG. 6 is a screenshot of an exemplary payment plan web page;

FIG. 7 is a screenshot of an exemplary dispute detail web page;

FIG. 8 is a screenshot of an exemplary identity theft data web page;

FIG. 13 is a screenshot of an exemplary virtual agent editor interface;

FIG. 14 is a screenshot of an exemplary virtual agent preferences interface;

FIG. 15 is a screenshot of an exemplary virtual agent statistics interface;

FIG. 16 is a screenshot of an exemplary Summary Node Interface;

FIG. 17 is a screenshot of an exemplary Logic Node Interface;

FIG. 18 is a screenshot of an exemplary Question Node Interface;

FIG. 19 is a screenshot of an exemplary Options Node Interface;

FIG. 20 is a screenshot of an exemplary Property Set Interface;

FIG. 21 is a screenshot of an exemplary Math Node Interface;

FIG. 22 is a screenshot of an exemplary Payment Plan Node Interface;

FIG. 23 is a screenshot of an exemplary Bankruptcy Node Interface;

FIG. 24 is a screenshot of an exemplary Dispute Node Interface;

FIG. 25 is a screenshot of an exemplary E-mail Node Interface;

FIG. 26 is a screenshot of an exemplary Exec Node Interface;

FIG. 27 is a screenshot of an exemplary Variable Node Interface;

FIG. 29 is a screenshot of an exemplary Eval Node Interface;

FIG. 30 is a screenshot of an exemplary Form Node Interface;

FIG. 31 is a screenshot of an exemplary Update Form Interface;

FIG. 32 is a screenshot of an exemplary Fields Interface, an exemplary Update Field Interface and an exemplary Preview Form display; and FIG. 33 is a screenshot of an exemplary Logoff Node Interface.

DETAILED DESCRIPTION OF EXEMPLARY EMBODIMENTS

Figure 2:
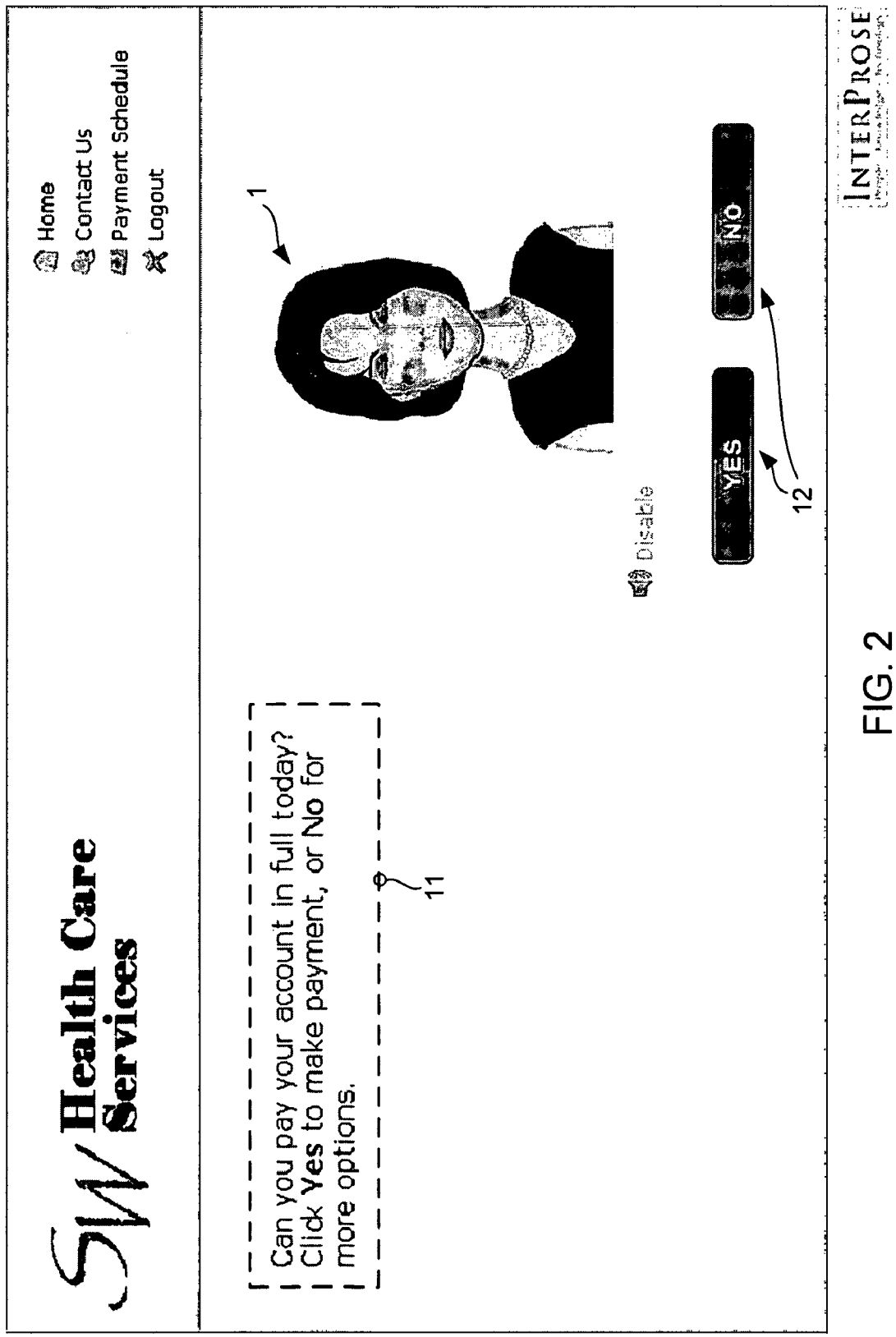
FIG. 2 is a screenshot of an exemplary pay-in-full web page.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

When an account becomes overdue, a borrower often needs help to negotiate and manage the account to a favorable outcome. Some studies show that the majority of creditors typically have Internet access. Other studies show that many creditors who have an overdue balance would rather respond to an on-line agent than a live agent. However, a simple web site typically lacks a personal touch and fails to make any contact on an emotional level. Often, a personal or emotional connection is all that is needed to turn a soon-to-be-adversarial encounter into a mutually-beneficial negotiation. This type of connection can be made more probable with a web site through the use of a virtual agent.

Some embodiments of the present invention relate to account management and collections through the use of a web-based virtual agent. Some embodiments comprise a virtual agent or avatar, which communicates with an end user to effectuate account negotiations or payment. In some embodiments, the virtual agent may emulate a human agent in appearance and sound and may deliver a scripted message to the user. In some embodiments, the virtual agent may be adaptive to user characteristics in order to present a more appealing appearance or to establish a favorable demeanor with a user.

An important aspect of a virtual agent in account management and collections is their human-like characteristics. A virtual agent may comprise human features that are typically used to establish an emotional connection. In human relations, eye contact is important in showing interest, concern and emotion and in establishing a connection with a person. Facial expression is another characteristic that is sensed visually and interpreted as communication that adds a personal layer to speech. A concerned facial expression, even one that originates from a virtual person, can soften an otherwise adversarial relationship and render an account holder more likely to pay a balance or prioritize account payment above other priorities.

A virtual agent may also comprise adaptive voice tonal qualities. An apologetic or concerned tone at the onset of a collections interaction can convey a willingness to help and put an account holder more at-ease rather than up-tight and adversarial. Likewise, an upbeat, happy tone of voice during payment processing or negotiating can reinforce an account holder's inclination to make a payment. In some embodiments, a virtual agent may also act on tonal variables to form tonal gestures, such as a sigh, and to express a tone of exclamation, surprise or relief.

In some embodiments of the present invention, a virtual agent that comprises a representation of at least a part of the human body can perform gestures to add to its repertoire of communicative actions. A virtual agent comprising a head, neck and shoulders may perform head movement gestures, such as nodding its head, tossing hair back or lowering its head in disapproval. In another exemplary embodiment, a virtual agent comprising a head, arm and hand may make hand gestures to show surprise, concern, shock, empathy, sympathy and other emotions that are typically signaled by hand gestures.

A virtual agent comprising variable voice characteristics and an animated representation of at least a part of the human body can be a powerful tool in the collection and negotiation processes. Although the virtual agent may not interact at the level of a live human agent, many users with overdue balances are embarrassed and shy away from real human interaction on the subject of their delinquent balance. While they shrink from real human interaction because of embarrassment, typical users still desire and respond positively to the personal touch of a virtual agent who shows concern and courtesy without the embarrassment of actual personal interaction.

User-Adaptive Virtual Agent

Some embodiments of the present invention may comprise a user-adaptive virtual agent that adapts to user data. User data may comprise a user's height, weight, race, gender, income, area of residence, zip code, area code, telephone number, occupation, marital status, product preferences, purchase history, credit information, account balances and other personal, professional, demographic and other information. Some embodiments may comprise a virtual agent that is adaptive to user data. A user-adaptive virtual agent application may modify virtual agent characteristics based on user data. For example, in an exemplary embodiment, a virtual agent's characteristics may vary based on a user's location. A user's location may be determined by address, zip code, area code, telephone number or by other information. When the location is determined, the virtual agent's characteristics may be modified or set to correspond to the user's location. In an exemplary embodiment, when the user's location is determined to be in the southeastern part of the United States, the virtual agent's voice, hairstyle, hair color, clothing, accessories, skin color and racial characteristics, apparent age, and other characteristics may be set to parameters that have been determined to be preferred for that location. Preferred characteristics for a location may be determined based on demographic data derived from surveys, studies and other sources.

Embodiments of the present invention may match a set of virtual agent characteristics to a set of user data. For example, a middle-aged, affluent man living in the Northwest may prefer to speak to a younger, attractive, well-dressed, brunette woman with a complex vocabulary. In this scenario, the virtual agent may take on these preferred characteristics when a user is determined to be a middle-aged, affluent man living in the Northwest. When the next user, a female between 20 and 30 years of age with little credit history, logs onto the system; the virtual agent may change characteristics to a dark-haired male in the mid-twenties with a deep voice and muscular arms. In some embodiments, each variation of user data may be assigned to a set of virtual agent characteristics. In some embodiments, a database may be employed to match user data to virtual agent characteristics. In some embodiments a look-up table may be used for this purpose. In some embodiments, a multi-dimensional matrix may be used to match virtual agent characteristic sets to sets of user data.

Some embodiments of the present invention may comprise a virtual agent designer or design tool for implementing the virtual agent and other features in a web-based account management scenario. In some embodiments, the virtual agent designer may comprise a graphical user interface that enables assembly of a complete virtual-agent-enabled account management web site, which provides for account data management, payment processing and balance negotiation.

Exemplary Virtual Agent Applications

Figure 1:
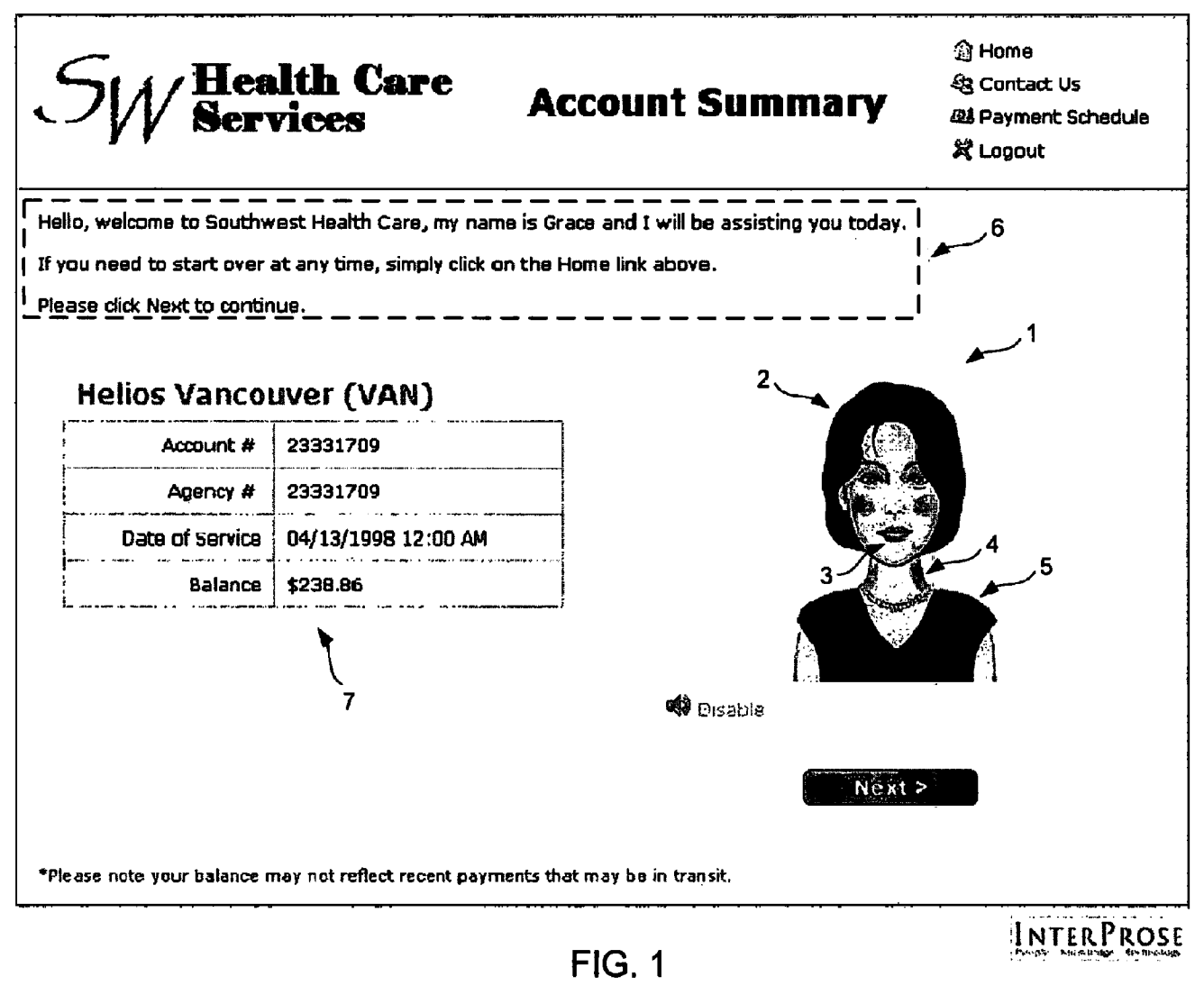

Some embodiments of the present invention comprise a web-based account management resource with a virtual agent. In an exemplary embodiment, illustrated in FIG. 1, the virtual agent 1 is represented as a partial human figure with a head and partial body shown. The virtual agent may comprise hair 2, facial features 3, skin tone 4 and clothing and accessories 5. In an exemplary embodiment, the virtual agent may be animated to show movement, facial expressions, lip movement to simulate speech or other expressions. Some embodiments may comprise head, hand, eye and other gestures alone or coupled with speech. In some embodiments, the virtual agent may form part of a multimedia presentation by presenting a message that is also presented textually on the web page. For example, a virtual agent 1 may "read" a text message 6 that is presented in text on the page. In presenting the message, the virtual agent may use head, hand, eye and facial movements, expressions or gestures to help articulate the message. In some embodiments, a virtual agent may also vary voice intonation for dramatic effect. In some embodiments, a virtual agent may be presented with account information 7 and may present the account information verbally or point out the information with a gesture. In some embodiments, a virtual agent may be presented with a login prompt to prompt access to the system.

Some exemplary embodiments of the present invention, illustrated in FIG. 2, may comprise a virtual agent 1 on a binary question/response page. In these embodiments, the virtual agent may present a question that may be answered with a yes or no response. In some embodiments, the question may also be presented in textual form 11 on the page. Input buttons 12 or similar input mechanisms may be used to collect an end-user response to the question. In some embodiments, the logic of the virtual agent 1 may operate on the actual text stored for text display 11, thereby "reading" the stored text using a text-to-voice process. In other embodiments, a voice recording or sound file may be recorded and played in conjunction with virtual agent animation to present a message corresponding to the displayed text 11. In an exemplary embodiment of an account management application, a virtual agent 1 may ask whether the end user can pay the delinquent account in full at that time. If the end user answers in the affirmative, the user may be directed to a scheduling page.

Figure 3:
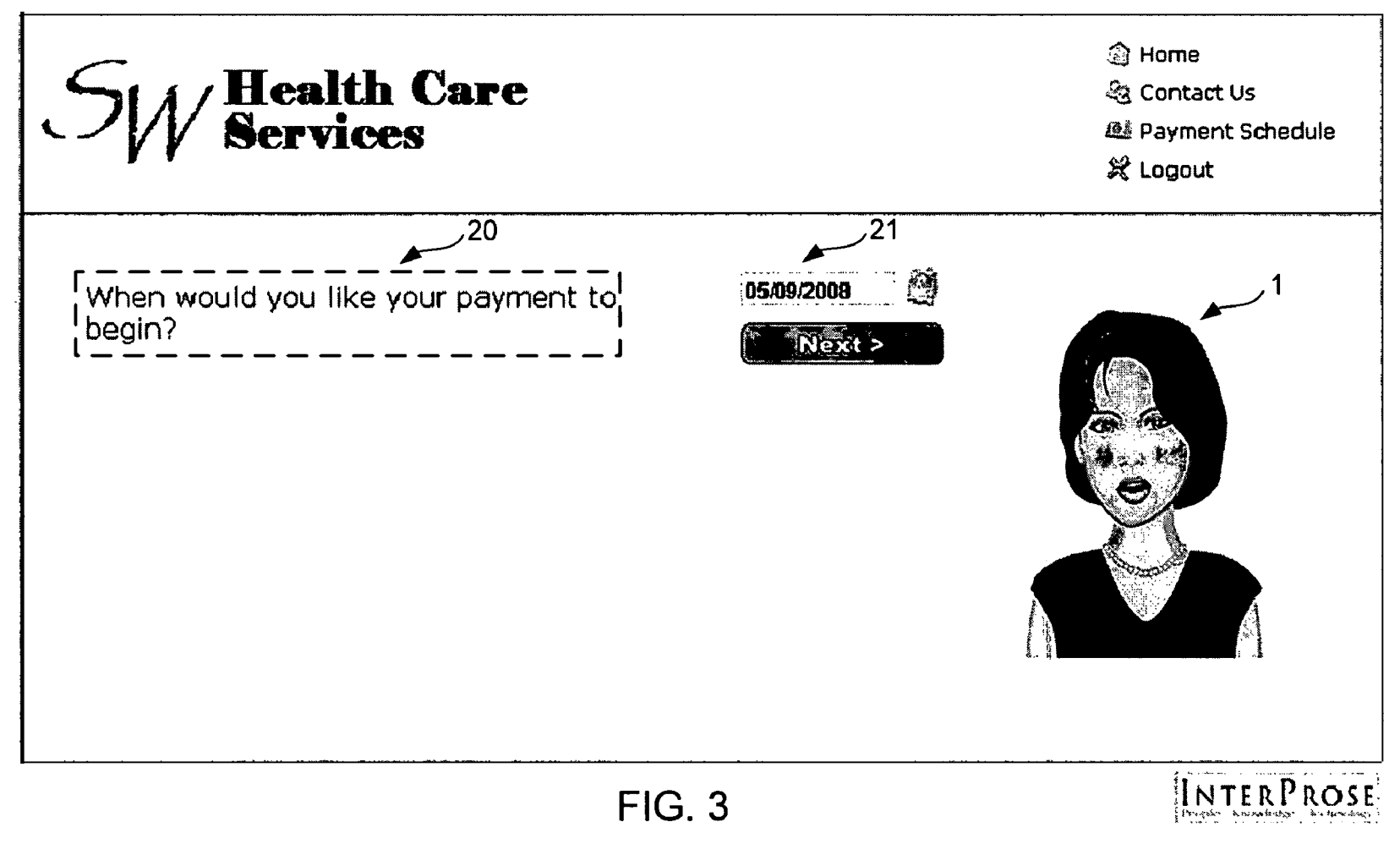

Some embodiments of the present invention may comprise a virtual-agent-enhanced scheduling page, as illustrated in FIG. 3. In these embodiments, a virtual agent 1 may present a scheduling message 20. An exemplary scheduling message may ask the end user when a payment can be made. In some embodiments, a calendar, such as a pop-up calendar 21 may be presented along with the virtual agent 1. The calendar may allow an end user to schedule a payment with simple point and click actions. In some embodiments, limitations may be placed on scheduled payments. For example, the limitation that a payment must be made within 14 days may be enforced through the calendaring system or through messaging during the calendaring process. In some embodiments, the virtual agent 1 may present a message identifying payment and scheduling limitations. Successful scheduling of a payment may link the user to a payment type page.

Figure 4:
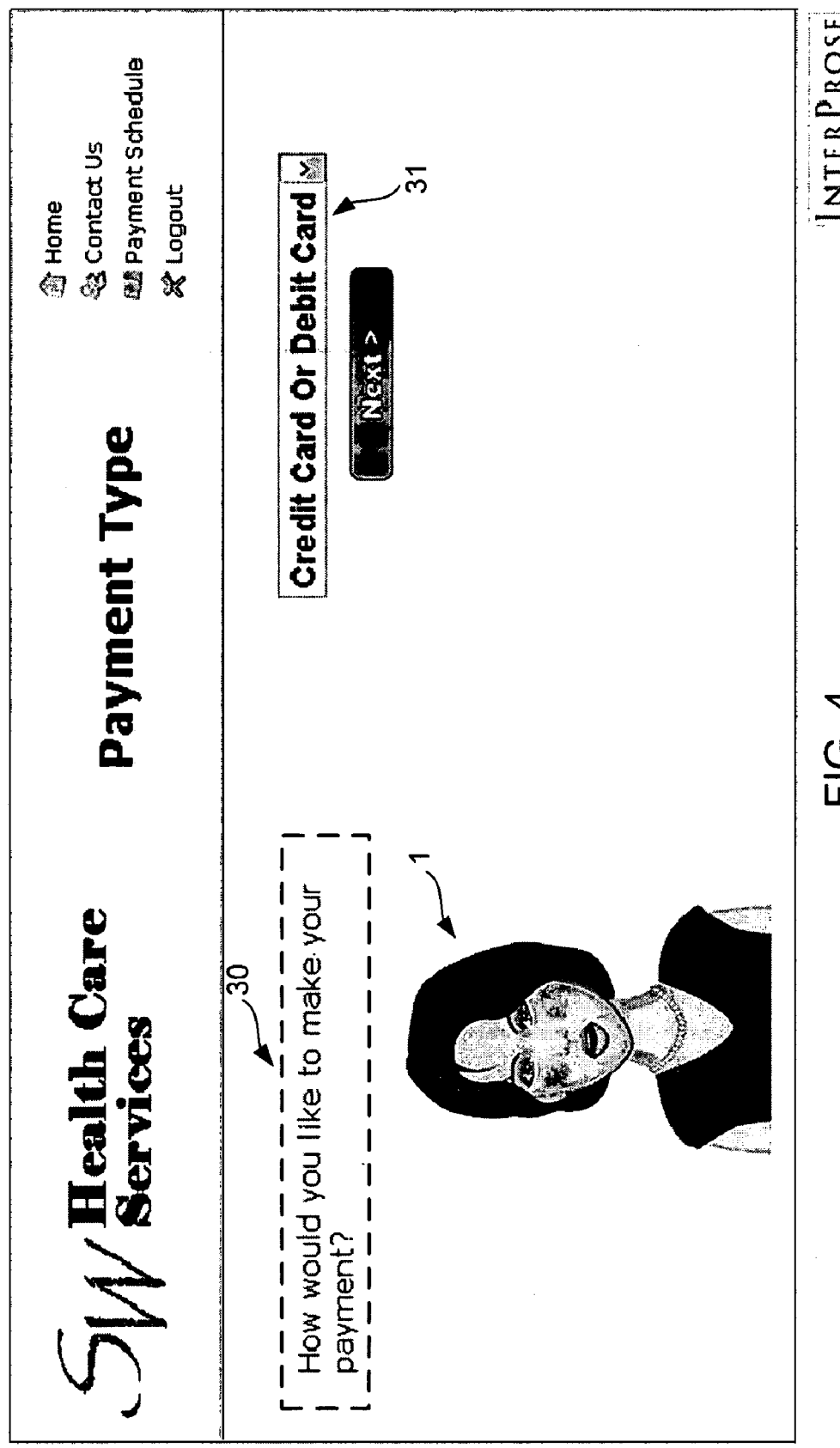
FIG. 4 is a screenshot of an exemplary payment type web page.

Some embodiments of the present invention may comprise a payment type page, as illustrated in FIG. 4. In these embodiments, a virtual agent 1 may present a payment type selection message 30, which may also be displayed in textual form on the payment type page. This presentation may be performed in conjunction with a payment type selection mechanism 31, such as a drop-down menu or similar selection mechanism. In some embodiments, the payment type selection mechanism may allow a user to choose to make a payment by debit card, credit card, electronic check or by other methods. Selection of a payment option may link to a payment info page that may collect payment details and perform an electronic payment transaction.

In an exemplary embodiment of an account management application, a virtual agent 1 may ask whether the end user can pay the delinquent account in full at that time, as illustrate in FIG. 2. If the end user answers in the negative, the user may be directed to a issue resolution page. An exemplary issue resolution page is illustrated in FIG. 5. In this exemplary embodiment, a virtual agent may present a selection message. The selection message may also be presented in text 40 as well as an audiovisual presentation by the virtual agent. An issue resolution page may also comprise a menu of issue resolution options. Exemplary issue resolution options may comprise a declaration that the balance cannot be made in full at the present time 41, a declaration that the user disputes all or a portion of the balance 42, a declaration that the user is the victim of identity fraud 43, a declaration that the user has paid the balance before receiving a statement 44, a declaration that the user has filed for bankruptcy 45 and a declaration that the balance has not been paid for a reason other than those listed as options 46.

In an exemplary embodiment, when a user makes a selection on an issue resolution page indicating that the entire balance of the account cannot be paid 41, the user may be linked to a payment options page. An exemplary payment options page is illustrated in FIG. 6. In this exemplary embodiment, a virtual agent 1 may present a payment options message 50, which may also be present in text form. The payment options page may also comprise payment option selections 51-53. Exemplary payment options may comprise: 10% down and 6 payments 51; 25% down and 4 payments 52; 50% down and 3 payments 53 or other payment options. Selection of one of the payment options may link a user to subsequent payment scheduling, payment type and payment information collection pages.

In an exemplary embodiment, when a user makes a selection indicating that part or all of the balance is disputed 42, the user may be linked to a dispute information page, as illustrated in FIG. 7. In this exemplary embodiment, a virtual agent 1 may present a dispute information message 60, which may also be present in text form. A dispute information page may also comprise a dispute reason box 61 for providing a reason for the dispute. The page may also comprise a dispute amount indication mechanism, such as a numeric entry box 62, where the amount in dispute may be indicated by the user.

Figure 8:
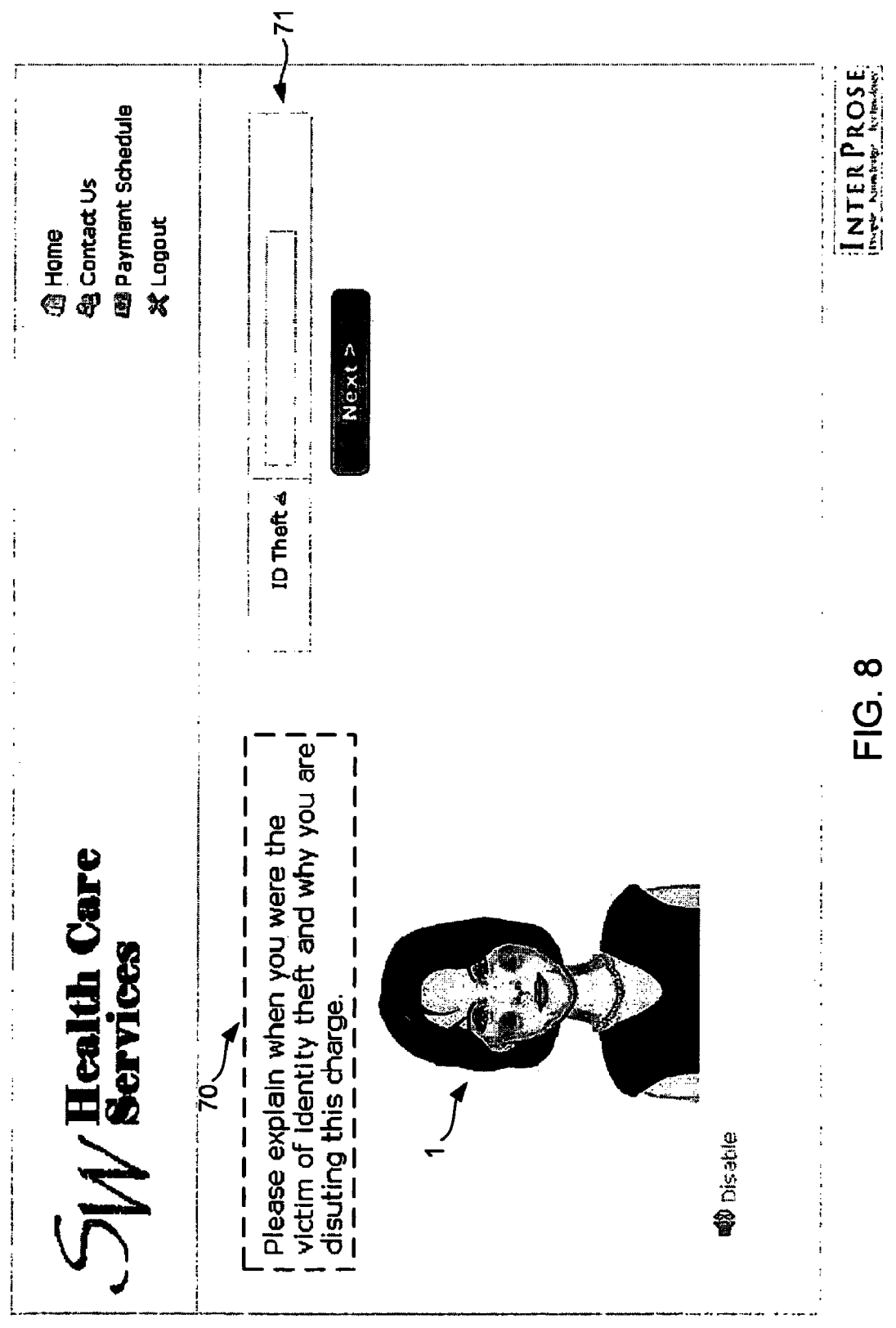

In an exemplary embodiment, when a user makes a selection on an issue resolution page indicating that identity theft has occurred, the user may be linked to an ID theft information page, as illustrated in FIG. 8. The ID theft information page, may comprise a virtual agent 1, which may make an audiovisual presentation of an ID theft information message 70, which may also be presented in text form. The ID theft information page may also comprise an ID theft information entry mechanism 71, such as a text entry box for accepting ID theft information.

Figure 9:
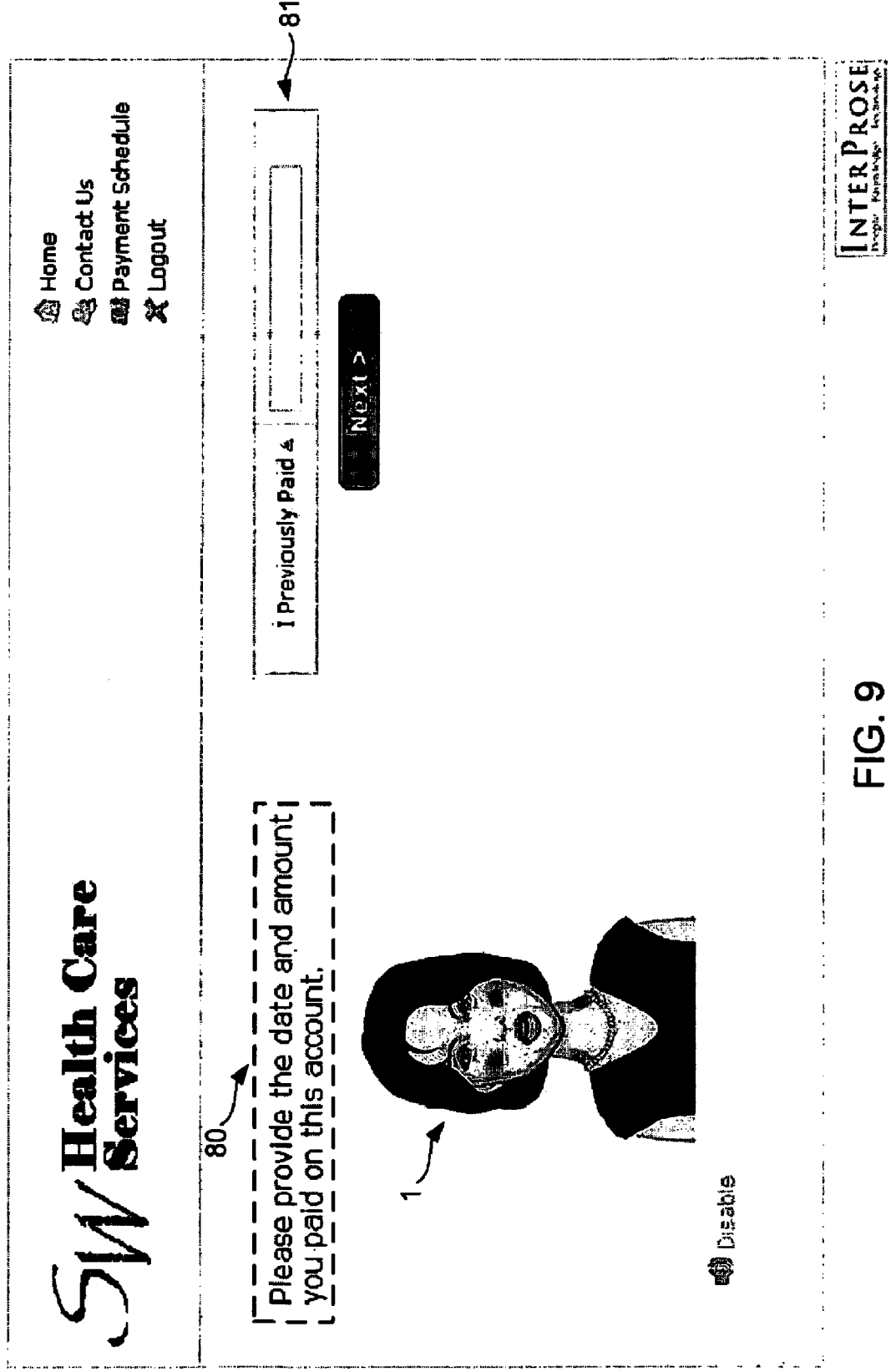
FIG. 9 is a screenshot of an exemplary payment made web page.

In an exemplary embodiment, when a user makes a selection on an issue resolution page indicating that a payment has been made 44, the user may be linked to a payment information page, as illustrated in FIG. 9. The payment information page may comprise a virtual agent 1, which presents a payment information message 80. The payment information may also be presented in text form. A payment information page may also comprise a payment information entry mechanism 81, such as a text or numeric entry box.

Figure 10:
FIG. 10 is a screenshot of an exemplary bankruptcy data web page.

In an exemplary embodiment, when a user makes a selection on an issue resolution page indicating that the user has filed for bankruptcy 45, the user may be linked to a bankruptcy information page, such as the page illustrated in FIG. 10. A bankruptcy information page may comprise a virtual agent 1, which may present a bankruptcy information message 90. A bankruptcy information message may also be presented in text form. A bankruptcy information page may also comprise a bankruptcy information input mechanism 91, such as one or more text or numeric input boxes for collection of bankruptcy information.

Virtual Agent Designer

Figure 11:
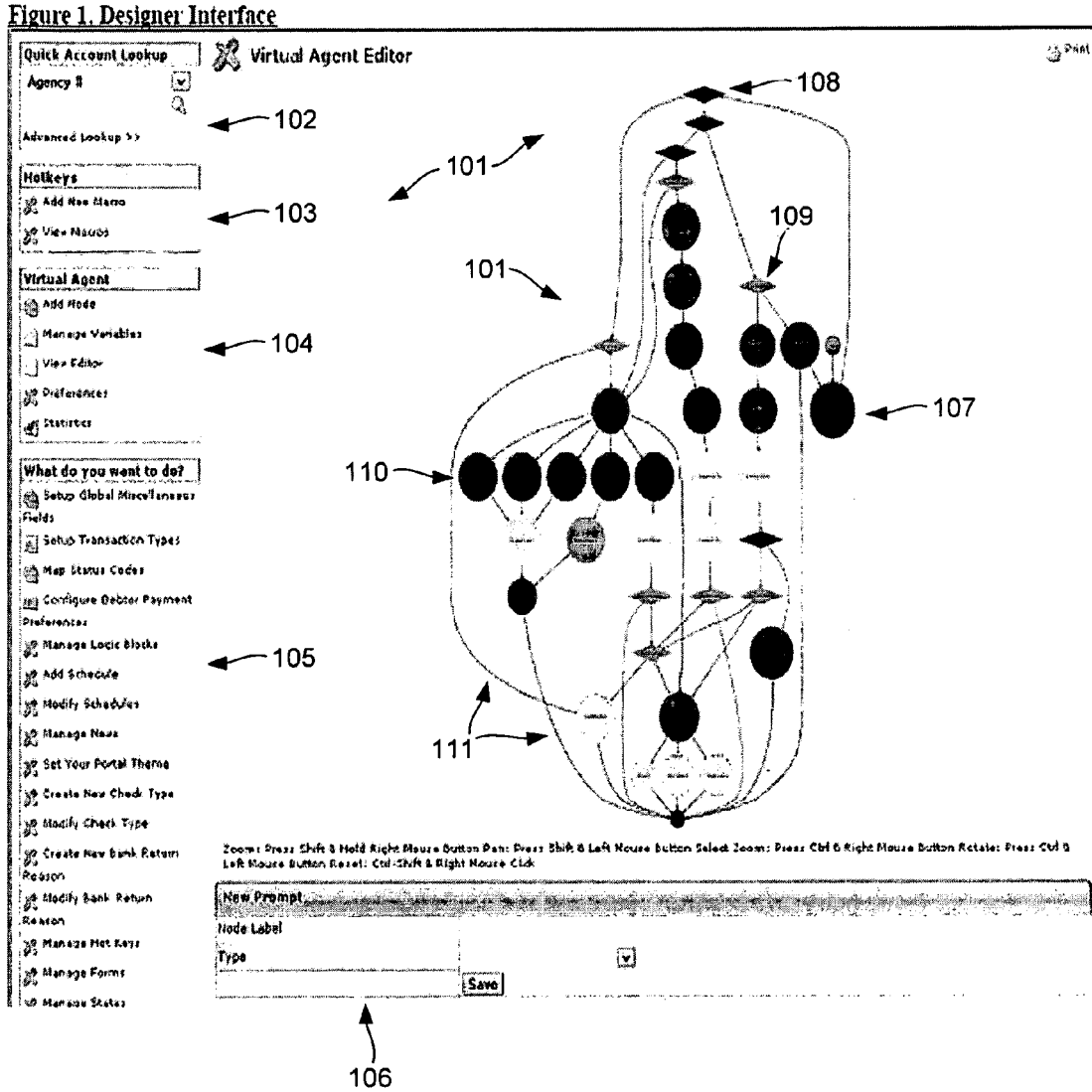
FIG. 11 is a screenshot of an exemplary virtual agent editor window.

Some embodiments of the present invention comprise a graphical user interface (GUI) application for design of a virtual-agent-enhanced web site. An exemplary screen image of this design application is illustrated in FIG. 11. In an exemplary embodiment, this design application comprises a graphical editor window 100 and several menus 102-106. The graphical editor window 100 displays an image of a flowchart-like graphical representation 101 of the web site. The graphical representation 101 may comprise nodes that are represented as graphical icons 107-110 and node links represented as lines, strings or arrows 111 that run between the node icons. The combination of node icons and node links may take the form of a flow chart. In some embodiments, the combination of node icons and node links may meet a typical flow chart standard. Some embodiments of the present invention may meet the flow chart standards described in: International Organisation for Standardisation (ISO), ISO 5807 *Information processing—Documentation symbols and conventions; program and system flowcharts*; and/or American National Standard, ANSI X3.6-1970, *Flowchart Symbols and their Usage in Information Processing*; which are hereby incorporated herein by reference.

In some embodiments, each node type may have a corresponding icon. In some embodiments, a node may represent a pre-defined page with associated content, graphics, logic, input and output mechanisms, virtual agent actions and other content. In some embodiments, node variables may define page characteristics and virtual agent characteristics, such as facial characteristics, hair color, skin tone, clothing, body characteristics, accessories and speech characteristics. Node variables for speech characteristics may comprise a text message to be spoken by the virtual agent, voice intonation, choice of language, dialect, accent, drawl and other characteristics.

Page characteristics may comprise input and output mechanisms such as text boxes, input boxes, drop-down menus and other menus as well as page style, color and formatting data.

Figure 12:
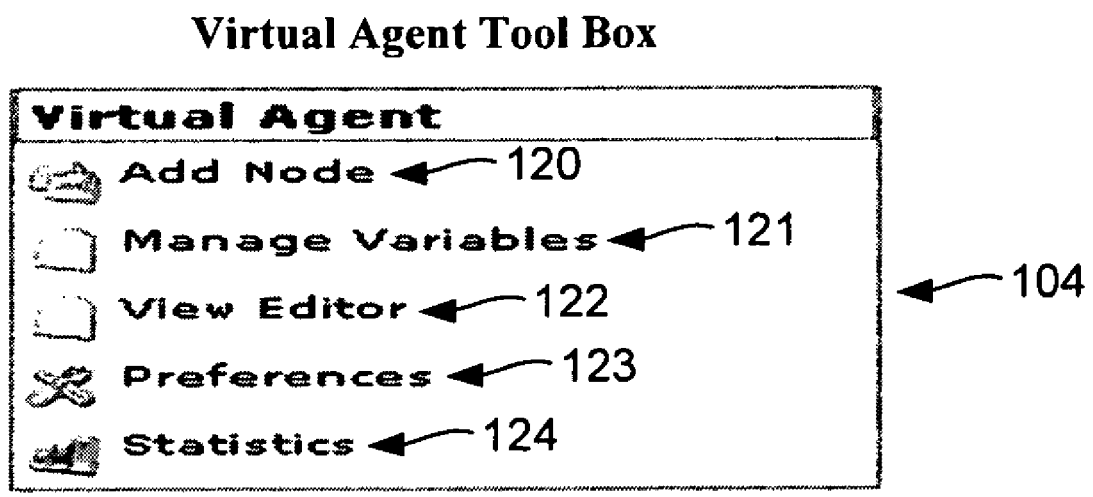
FIG. 12 is a screenshot of an exemplary tool box menu.

In an exemplary editor embodiment, a node may be added to a web site in the design process by several methods. Using a first method, a designer may select the "Add Node" option from a screen "virtual agent" tool box menu 104 (shown in FIG. 11 and FIG. 12). This selection may cause a node data window 106 to appear on the screen. Each node data window 106 comprises input mechanisms for defining node characteristics and node links. Once this information is entered through an input mechanism, a node may appear in the graphical editor window 106. Depending on the node and link information entered, the node may also have a node link 111. The icon associated with the node and the placement of the node within a flow chart structure may also be defined by the information entered into the node data window 106. In some embodiments, some node data and node link information may be input by pointing device input on the graphical editor window. In some embodiments node links, flow chart structure and other data may be input by dragging and dropping one or more points on the node icon and node link structures displayed in the graphical editor window.

In some embodiments, alternative input mechanisms may be used to accept node data input. For example, in some embodiments, a node may be established by placing a pointing device cursor on the graphical editor window 106 and effecting an input command, such as a right-click of a mouse button, which may result in the appearance of an input window comprising mechanisms for node data input. Node data may then be input in the window and the node may appear in the graphical editor window 100 upon completion of node data entry or at some other time in the process.

Subsequent nodes may then be added as needed to construct a web site comprising pages defined by nodes 107-110 and links 111 that are illustrated in the graphical editor window 100. Accordingly, an account management web site may be designed by input of node and link data that are represented visually as a flow chart of the web site. In this manner, web site logic and other attributes may be inspected and edited based on the visual representation in the graphical editor window 100.

In some embodiments, the graphical editor window 100 may comprise an exemplary tool box menu 104 (see FIGS. 11 & 12) comprising an Add Node option 120 (as described above), a Manage Variables option 121, a View Editor option 122, a Preferences option 123, a Statistics option 124 and other options.

The Manage Variables option 121 may be used to invoke an interface that allows management of variables related to a node or web page that may comprise a virtual agent. Variables may relate to web page characteristics, virtual agent characteristics, account-holder data and other parameters. These variables may be added, changed or deleted through this interface. An exemplary Manage Variables interface is shown in FIG. 13, wherein exemplary account-holder financial variables 128 are shown. Account holder variables may be populated from internal records, a search of web-connected resources, direct account-holder input, site operator input of by other methods.

The View Editor option 122 may open, restore or move (e.g., to front of a display space) the graphical editor window 100. Selection of this option may restore the graphical editor window when other windows have been opened over it. This selection may allow a user to utilize the graphical editor window for design, modification or editing of individual elements of the web interface and provides access to graphical nodes 107-110 and links 111 for editing with the interface.

An exemplary tool box Preferences option 123 may invoke a preferences interface or menu that allows setting and management of global properties related to a virtual agent, a site operator, global site properties and other properties. An exemplary preferences interface window is shown in FIG. 14.

Selection of the Statistics menu option 124 may invoke a window or other presentation of site performance statistics. An exemplary Statistics menu option 124 is shown in FIG. 15. Some embodiments may display statistics comprising the number of actions completed, the number of actions aborted, the number of payments completed, the number of settlements negotiated, the number of transactions involving bankruptcies, the number of disputes settled or negotiated, the number of sessions completed and other statistics.

Exemplary Nodes

Nodes, such as exemplary nodes 107-110, represent web pages that may be wholly or partially configured with variables, parameters and characteristics defined by a site operator, site designer, end user or account-holder. These variables, parameters and characteristics may be responsive to account-holder data, such as the exemplary virtual agent variables, parameters and characteristics described above.

Some embodiments of the present invention comprise a Summary Node, which may be associated with a Summary Node Icon (e.g., icons 107-110) that may be displayed in the graphical editor window 100. The Summary Node is also associated with a Summary Node Interface (e.g., window) that may display and allow editing of a node label, node text message, virtual agent characteristics and other parameters and data. An exemplary Summary Node Interface is shown in FIG. 16.

Some embodiments of the present invention comprise a Logic Node, which may be associated with a Logic Node Icon (e.g., icons 107-110) that may be displayed in the graphical editor window 100. The Logic Node is also associated with a Logic Node Interface (e.g., window) that may display and allow editing of a node label, node logical operator, virtual agent characteristics, conditional branching and routing options and other parameters and data. In some embodiments, the logic node does not trigger display of content to an end user/account-holder, but effects logical operations based on user input or other data. An exemplary Logic Node Interface is shown in FIG. 17.

Some embodiments of the present invention comprise a Question Node, which may be associated with a Question Node Icon (e.g., icons 107-110) that may be displayed in the graphical editor window 100. The Question Node is also associated with a Question Node Interface (e.g., window) that may display and allow editing of a node label, page label, node text message or question, virtual agent characteristics, conditional branching and routing options and other parameters and data. In some embodiments, a Question Node Interface may comprise options for conditional operations based on end user responses to the associated question. In some embodiments, optional true and false selections may be defined in the interface and associated with functions based on those selections. An exemplary Question Node Interface is shown in FIG. 18.

Some embodiments of the present invention comprise an Options Node, which may be associated with an Options Node Icon (e.g., icons 107-110) that may be displayed in the graphical editor window 100. The Options Node is also associated with an Options Node Interface (e.g., window) that may display and allow editing of a node label, page label, node text message, user-selectable options, virtual agent characteristics and other parameters and data. In some embodiments, options to be presented to an end user through a web page may be selected and configured through the Options Node Interface. In some embodiments, an option label 130, option variable 13 land option prompt number may be displayed and accessed in the Option Node Interface. In some embodiments, the option label 130 or message may define a message that will be displayed as a prompt to an end user and the option variable 131 may define where the end user's response to that message is to be stored and accessed. Some embodiments of the Option Node Interface may also comprise an Update Option menu 132 or sub-interface to provide convenient editing or modification of option labels, variables and other associated parameters. An exemplary Options Node Interface is shown in FIG. 19.

Some embodiments of the present invention comprise a Property Set Node, which may be associated with a Property Set Node Icon (e.g., icons 107-110) that may be displayed in the graphical editor window 100. The Property Set Node is also associated with a Property Set Node Interface (e.g., window) that may display and allow editing of a node label, page label, node text message, virtual agent characteristics and other parameters and data. In an exemplary embodiment, a Property Set Node Interface may comprise an update property menu for convenient editing or modification of Property Set Node variables and parameters. In some embodiments, a Property Set Node may effectuate a web page that gathers input from an end user. A Property Set web page may prompt an end user with a question and provide an input mechanism for gathering data relative to that question. An exemplary Property Set Node Interface is shown in FIG. 20.

Some embodiments of the present invention comprise a Math Node, which may be associated with a Math Node Icon (e.g., icons 107-110) that may be displayed in the graphical editor window 100. The Math Node is also associated with a Math Node Interface (e.g., window) that may display and allow editing of a node label, node parameters, node variables, node mathematical operators, node links and other parameters and data. In some embodiments, operators and functions associated with a Math Node may access variables and data in local and remote locations and calculate values based on that data and the operators and function defined through the Math Node Interface. These calculated values may then be used in other calculations and conditional decision making. An exemplary Math Node Interface is shown in FIG. 21.

Some embodiments of the present invention comprise a Payment Plan Node, which may be associated with a Payment Plan Node Icon (e.g., icons 107-110) that may be displayed in the graphical editor window 100. The Payment Plan Node is also associated with a Payment Plan Node Interface (e.g., window) that may display and allow editing of a node label, node text message, node-related dates, number of payments variable, payment frequency variable, payment amount variable, payment total variable, down payment percent variable, period variable, link or next node variables, virtual agent characteristics and other parameters and data. An exemplary Payment Plan Node may effectuate a web page that prompts an end user for payment plan options and data such as a payment start date, the number of payments, the payment frequency, the payment amount, the payment total, a down payment percentage and a payment period. In some embodiments, some of these options and data may be calculated from other input either through invocation of a Math Node or by other means. In some embodiments, a Payment Plan Node may effectuate the construction of a payment plan for an end user based on user input and system data regarding the user. An exemplary Payment Plan Node Interface is shown in FIG. 22.

Some embodiments of the present invention comprise a Bankruptcy Node, which may be associated with a Bankruptcy Node Icon (e.g., icons 107-110) that may be displayed in the graphical editor window 100. The Bankruptcy Node is also associated with a Bankruptcy Node Interface (e.g., window) that may display and allow editing of a node label, node text message, bankruptcy chapter type, case number, district, court name, state, file date, dismissal data, dismissal date, discharge data, discharge date, attorney data comprising name, firm, phone number and address data and other parameters and data. A Bankruptcy Node may work in conjunction with a Property Set Node, which effectuates a web page that prompts an end user for bankruptcy information and provides an input mechanism for gathering and recording end user bankruptcy data. In some embodiments, a Bankruptcy Node may record and analyze data gathered with the associated Property Set Node. An exemplary Bankruptcy Node Interface is shown in FIG. 23.

Some embodiments of the present invention comprise a Dispute Node, which may be associated with a Dispute Node Icon (e.g., icons 107-110) that may be displayed in the graphical editor window 100. The Dispute Node is also associated with a Dispute Node Interface (e.g., window) that may allow configuration of data acquisition related to a node label, dispute type, dispute reason, dispute amount, node text message, virtual agent characteristics and other parameters and data. In some embodiments, a Dispute Node may operate in conjunction with a Property Set Node to record data and statistics related to input received from a web page effectuated through the Property Set Node. In some embodiments, data gathered for dispute type, reason, amount and other data may be recorded and analyzed. This dispute data may then be used in calculations or other interfaces. An exemplary Dispute Node Interface is shown in FIG. 24.

Some embodiments of the present invention comprise an E-mail Node, which may be associated with an E-mail Node Icon (e.g., icons 107-110) that may be displayed in the graphical editor window 100. The E-mail Node is also associated with an E-mail Node Interface (e.g., window) that may display and allow editing of a node label, node text message, e-mail address data, recipient data, e-mail message data, e-mail subject line data, virtual agent characteristics and other parameters and data. In some embodiments, an E-mail Node may effectuate an E-mail process that sends e-mail to designated recipients. In some embodiments, the message may be defined using the E-mail Node Interface. In some embodiments, the e-mail message and the recipients may be determined dynamically based on other variables and parameters in the system. An exemplary E-mail Node Interface is shown in FIG. 25.

Figure 26:
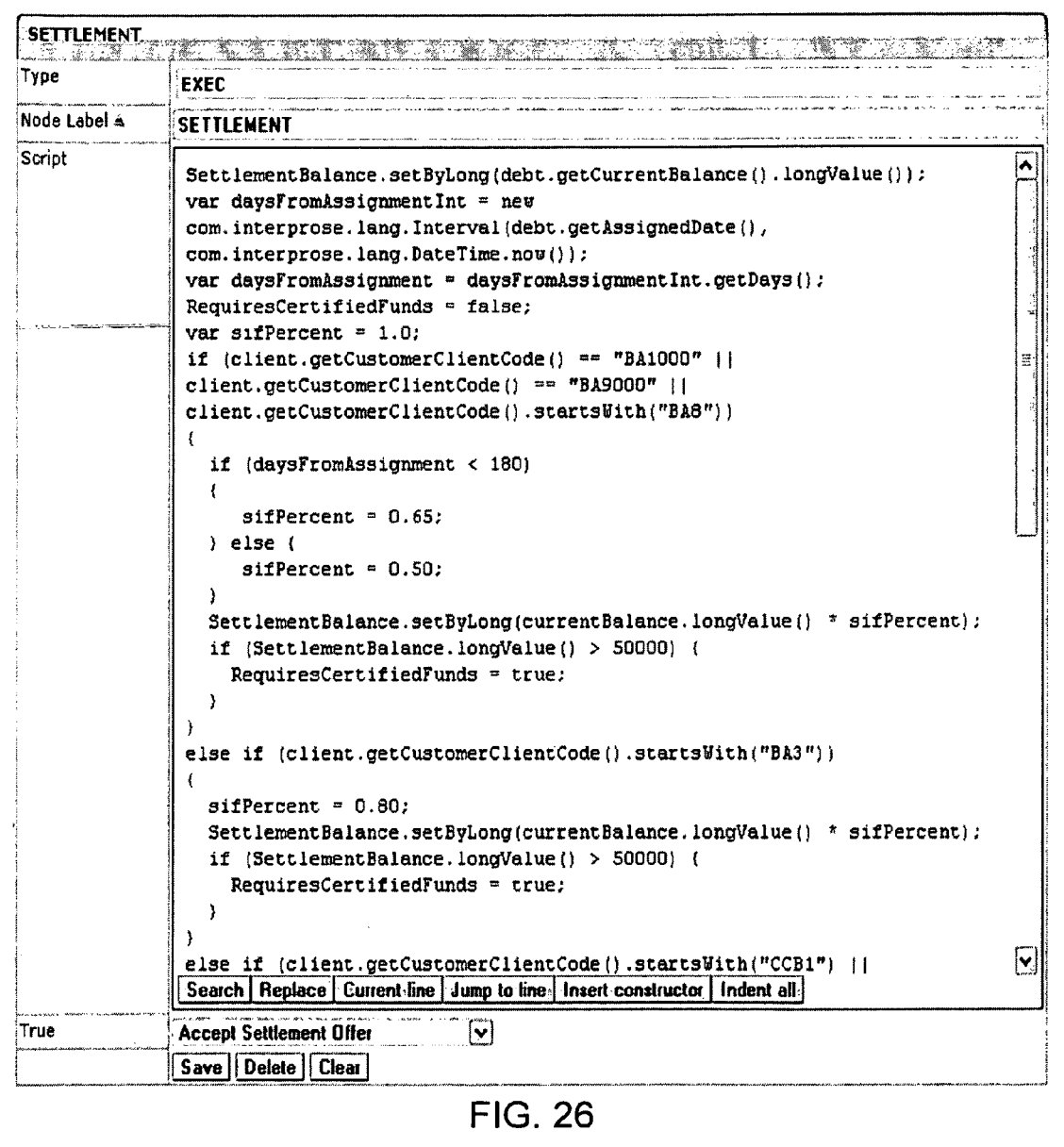

Some embodiments of the present invention comprise an Exec Node, which may be associated with an Exec Node Icon (e.g., icons 107-110) that may be displayed in the graphical editor window 100. The Exec Node is also associated with an Exec Node Interface (e.g., window) that may display and allow editing of a node label, executable code, script, programming constructs, conditional operators and other parameters and data. In some embodiments, an Exec Node may provide functionality to execute programming constructs (e.g., java script) for the purpose of complex calculations, decisioning and external web service access. An exemplary Exec Node Interface is shown in FIG. 26.

Some embodiments of the present invention comprise a Variable Node, which may be associated with a Variable Node Icon (e.g., icons 107-110) that may be displayed in the graphical editor window 100. The Variable Node is also associated with a Variable Node Interface (e.g., window) that may display and allow editing of a node label, variable value, variable name, next node link and other parameters and data. In some embodiments, a Variable Node Interface provides for the setting of a variable value at a designate point in a web site structure. An exemplary Variable Node Interface is shown in FIG. 27.

Figure 28:
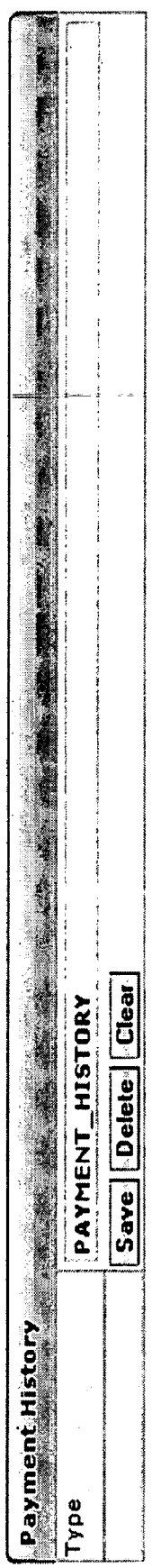
FIG. 28 is a screenshot of an exemplary Payment History Node Interface.

Some embodiments of the present invention comprise a Payment History Node, which may be associated with a Payment History Node Icon (e.g., icons 107-110) that may be displayed in the graphical editor window 100. The Payment History Node is also associated with a Payment History Node Interface (e.g., window) that may allow a site operator to save, delete, clear or otherwise modify or reset an end user's payment history data. In some embodiments, a Payment History Node may effectuate the display of an end user's payment history information. An exemplary Payment History Node Interface is shown in FIG. 28.

Some embodiments of the present invention comprise an Eval Node, which may be associated with an Eval Node Icon (e.g., icons 107-110) that may be displayed in the graphical editor window 100. The Eval Node is also associated with an Eval Node Interface (e.g., window) that may display and allow editing of a node label, executable code, script, programming constructs, conditional operators and other parameters and data. In some embodiments, an Eval Node may provide functionality to execute programming constructs (e.g., java script) for the purpose of complex calculations, decisioning and external web service access. The Eval Node may effect a process that returns a Boolean result and may define conditional processes to be followed based on the Boolean result. An exemplary Eval Node Interface is shown in FIG. 29.

Some embodiments of the present invention comprise a Form Node, which may be associated with a Form Node Icon (e.g., icons 107-110) that may be displayed in the graphical editor window 100. The Form Node is also associated with a Form Node Interface (e.g., window) that may display and allow editing of a node label, node text message or prompt, associated form web pages, form identifier, form icon data, form type data, form instance data, form location data, form role data, virtual agent characteristics and other parameters and data. An exemplary Form Node Interface may comprise input mechanisms for a node type, node label, text message, form name and links to connected pages or forms. A Form Node may effect the display of a form and enable printing of a form from a web page interface. An exemplary Form Node Interface is shown in FIG. 30.

Figure 31:
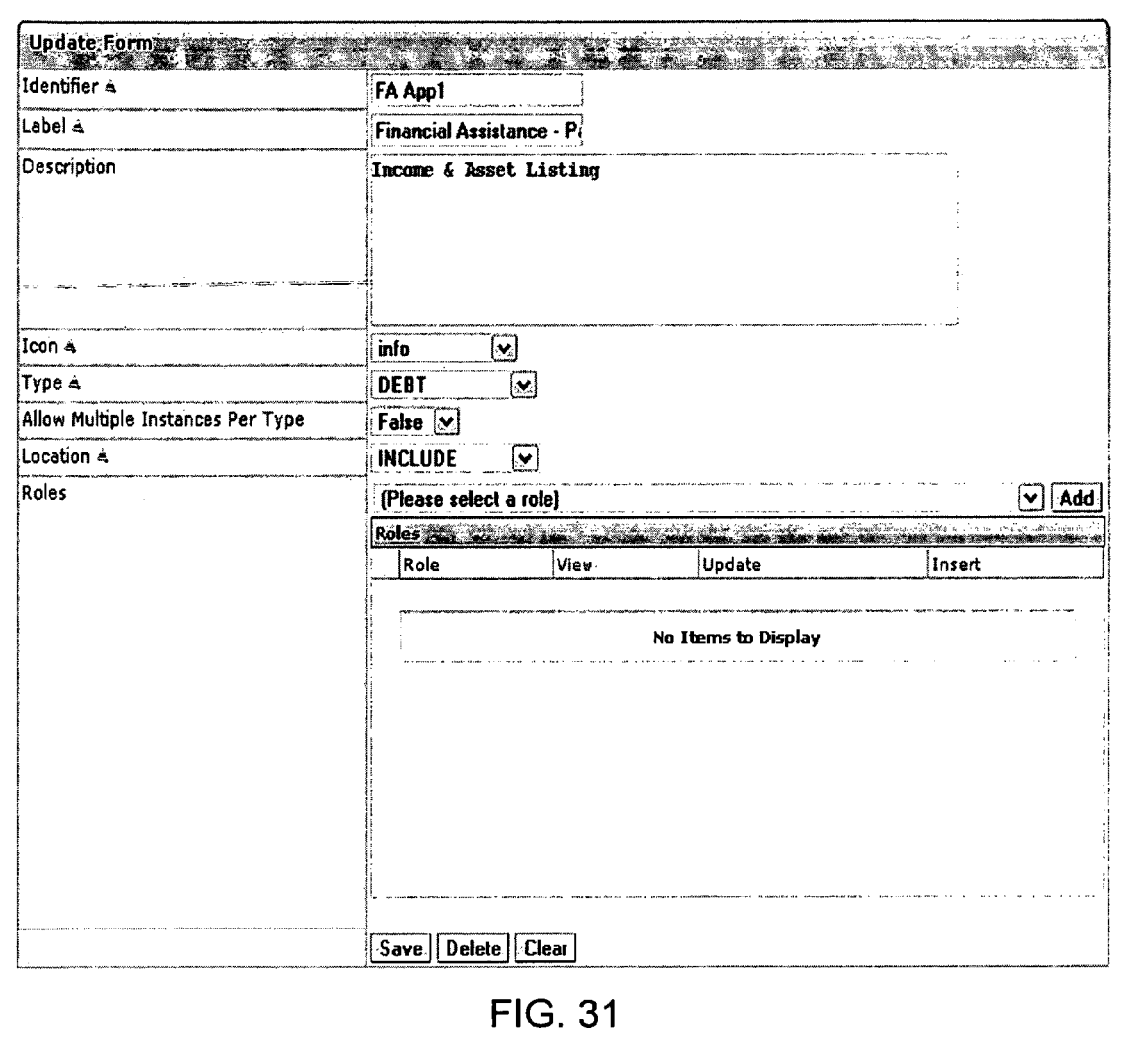

Forms accessed through web pages related to a From Node may be created and/or modified with an Update Form Interface. An Update Form Interface may comprise a window that provides for input defining a form identifier, a form label, a form description, a form icon, a form type, a form instance limitation variable, a form location variable, a form role data designator and other input. Use of the Update Form Interface may create a specific form that may be designed into a web site by placing a Form Node into the graphical editor window 100. An exemplary Update Form Interface is shown in FIG. 31.

Various pages associated with nodes of embodiments of the present invention may comprise fields for collecting and storing data. Each field may be associated with a label or prompt, a field identifier, a field type and other data. These fields may be maintained with a Fields Interface, which may present a window with a list of fields and their associated values displayed for viewing and editing. An exemplary Fields Interface 140 is shown in FIG. 32.

In some embodiments, selection of a field in the Fields Interface may invoke an Update Field Interface 141, which provides editing functions for that specific field. An exemplary Update Field Interface 141 may comprise input and editing mechanisms for field parameters such as a field label, field identifier, field type, field group, field display characteristics, mandatory field status, field searchability characteristics and field display characteristics. An exemplary Update Field Interface is shown as 141 in FIG. 32.

Some embodiments of the present invention may comprise a Form/Field Preview function that may be accessed from the Form Node Interface, Update Form Interface, Fields Interface, Update Field Interface, a menu on the graphical editor window 100 and/or other locations. The Form/Field Preview function allows a form or field structure to be displayed during or after design and creation using the tools described above or by other methods. A form or field structure may be previewed to assess its accuracy and functions. An exemplary Form/Field Preview display 141 is shown in FIG. 32.

Figure 33:
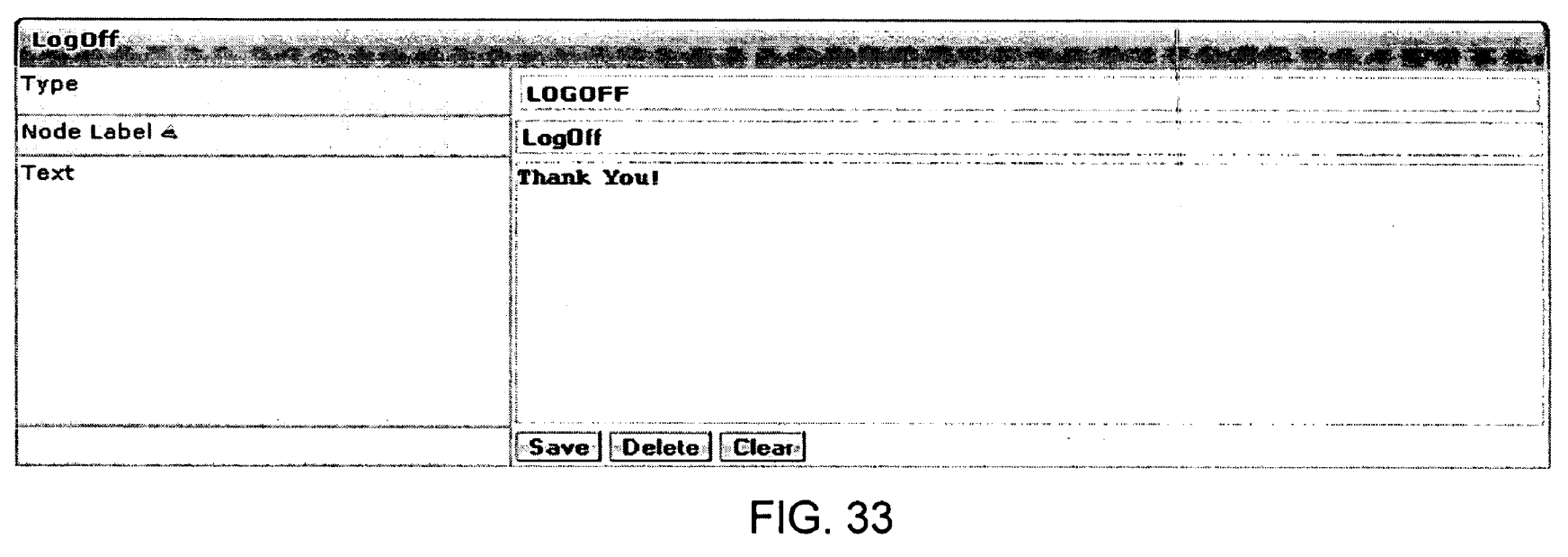

Some embodiments of the present invention comprise a Logoff Node, which may be associated with a Logoff Node Icon (e.g., icons 107-110) that may be displayed in the graphical editor window 100. The Logoff Node is also associated with a Logoff Node Interface (e.g., window) that may display and allow editing of a node label, node text message, node type, virtual agent characteristics and other parameters and data. A Logoff Node may effect a web page that displays a logoff message. In some embodiments, the web page effectuated by the Logoff Node may comprise a virtual agent that presents the logoff message in a manner described above. An exemplary Logoff Node Interface is shown in FIG. 33.

Some embodiments of the present invention comprise a graphical editor window that allows creation and placement of nodes and links in a flow-chart-like diagram, wherein nodes represent web pages and links represent relationships between the web pages. The structure of the node icons and links in the graphical editor window defines a web site. In some embodiments, nodes may represent web pages that comprise a virtual agent that may present messages both audibly and with gestures. In some embodiments, nodes may be associated with preconfigured or pre-defined web pages that are structured for a particular purpose. In some embodiments, sets of predefined web pages may be oriented to account collection and management. In account collection and management embodiments, a collection agent can quickly and easily assemble a collection web site through manipulation of nodes in a graphical editor window.

Some embodiments of the present invention comprise a web resource comprising a virtual agent that presents account collection prompts and messages using audible voice or simulated voice messages in conjunction with facial and other gestures. Some embodiments comprise a virtual agent that is adaptive to end user characteristics and data, wherein the virtual agent may change characteristics such as voice and appearance based on user characteristics.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for web-based account collections management, said method comprising:
    presenting a delinquent-account-resolution multi-media message to a user through a virtual agent, wherein said virtual agent comprises animated features that move in coordination with an audible message portion of said delinquent-account-resolution multi-media message to emulate speech and human-like gestures wherein said gestures comprise a hand gesture presenting a text message portion of said delinquent-account-resolution multi-media message and said gestures further comprise a facial gesture expressed in coordination with said audible message portion, wherein said presenting is performed on a display device and wherein said delinquent-account-resolution multi-media message comprises communication of payment plan options for a delinquent account;
    accepting input from said user in response to said multi-media message, wherein said input comprises a selection of one of said payment plan options;
    presenting a virtual agent response message in response to said accepting input wherein said virtual agent indicates approval or disapproval of said input by one of a display of a physical gesture and a change in voice tone; and
    effecting an account transaction based on said input.

2. A method as described in claim 1 further comprising receiving user account data wherein said account data comprises at least one of a user's height, weight, race, gender, income, area of residence, zip code, area code, telephone number, occupation, marital status, product preferences, purchase history, credit information and account balances and wherein said virtual agent animated features are varied based on said user account data.

3. A method as described in claim 1 further comprising receiving user account data wherein said account data comprises at least one of a user's height, weight, race, gender, income, area of residence, zip code, area code, telephone number, occupation, marital status, product preferences, purchase history, credit information and account balances and wherein said virtual agent comprises attributes comprising voice, hairstyle, hair color, clothing, accessories, skin color and racial characteristics and apparent age and said virtual agent attributes are varied based on said user account data.

4. A method as described in claim 1 wherein aspects of said animated features are matched to an estimated user preference.

5. A method as described in claim 1 wherein aspects of said multi-media message are matched to an estimated user preference.

6. A method as described in claim 1 wherein said delinquent account is owned by a third party and said transaction comprises successful negotiation of a payment plan, said method further comprising receiving compensation for said transaction from said third party.

7. A method as described in claim 1 further comprising receiving user account data and selecting said animated features and other virtual agent features based on said account data.

8. A method as described in claim 1 wherein said delinquent-account-resolution multi-media message comprises a payment scheduling message and said effecting an account transaction comprises collecting a payment.

9. A method as described in claim 1 wherein said delinquent-account-resolution multi-media message comprises a payment type selection message wherein a plurality of electronic payment options are presented.

10. A method as described in claim 1 wherein said delinquent-account-resolution multi-media message comprises presentation of an issue resolution process wherein a user may make a selection identifying issues selected from the set consisting of: the balance cannot be paid in full, the user disputes all or a portion of the balance, the user is a victim of identity fraud, the user has paid the balance, the user has filed for bankruptcy, and the balance has not been paid for other reasons.

11. A method as described in claim 1 wherein said delinquent-account-resolution multi-media message comprises presentation of multiple payment plans comprising a plurality of installment payments and said effecting an account transaction comprises recording a commitment from the user to adhere to one of said payment plans.

12. A method as described in claim 1 wherein said delinquent-account-resolution multi-media message comprises a dispute information message that allows a user to identify an amount in dispute.

13. A method as described in claim 1 wherein said delinquent-account-resolution multi-media message comprises a bankruptcy information page which allows a user to input bankruptcy information for a user's current bankruptcy filing.

14. A method for web-based account collections management, said method comprising:
receiving user account data for an account, wherein said account data comprises at least one of a user's height, weight, race, gender, income, area of residence, zip code, area code, telephone number, occupation, marital status, product preferences, purchase history, credit information and account balances;
determining user characteristics based on said account data, wherein said user characteristics comprise a user's age and a user's gender;
presenting a delinquent-account-resolution multi-media message to a user through a virtual agent, wherein said virtual agent comprises attributes and animated features, wherein said attributes comprise voice, hairstyle, hair color, clothing, accessories, skin color and racial characteristics and apparent age, wherein said animated features move in coordination with an audible portion of said delinquent-account-resolution multi-media message to emulate speech and human-like gestures and wherein said attributes and animated features are adaptive to said user characteristics, wherein said presenting is performed on a display device and wherein said multi-media message comprises communication of payment plan options for said account;
accepting input from said user in response to said delinquent-account-resolution multi-media message wherein said input comprises a selection of one of said payment plan options;
presenting a virtual agent response message in response to said accepting input wherein said virtual agent indicates approval or disapproval of said input by one of a display of a physical gesture and a change in voice tone; and
effecting an account transaction for said account based on said input.

15. A method as described in claim 14 wherein said user characteristics further comprise a user location and said virtual agent hairstyle, hair color, clothing, skin color and racial characteristics vary depending on said user location.

16. A method as described in claim 14 wherein said user characteristics further comprise user credit data.

17. A method as described in claim 14 wherein said user characteristics further comprise a user language and said virtual agent hairstyle, hair color, clothing, skin color and racial characteristics vary depending on said user language.

18. A method as described in claim 14 wherein said user characteristics further comprise a user purchase history.

19. A method as described in claim 14 wherein said account is owned by a third party and said transaction comprises successful negotiation of a payment plan, said method further comprising receiving compensation for said effecting said account transaction from said third party.

20. A non-transitory, computer-readable medium comprising executable instructions for implementing a method for web-based account collections management, said executable instructions comprising instructions for:
presenting a delinquent-account-resolution multi-media message to a user through a virtual agent, wherein said virtual agent comprises animated features that move in coordination with an audible message portion of said delinquent-account-resolution multi-media message to emulate speech and human-like gestures wherein said gestures comprise a hand gesture presenting a text message portion of said delinquent-account-resolution multi-media message and said gestures further comprise a facial gesture expressed in coordination with said audible message portion, wherein said presenting is performed on a display device and wherein said delinquent-account-resolution multi-media message comprises communication of payment plan options for a delinquent account;
accepting input from said user in response to said multi-media message, wherein said input comprises a selection of one of said payment plan options;
presenting a virtual agent response message in response to said accepting input wherein said virtual agent indicates approval or disapproval of said input by one of a display of a physical gesture and a change in voice tone; and
effecting an account transaction based on said input.

* * * * *